United States Patent
Uehane et al.

(10) Patent No.: US 10,180,103 B2
(45) Date of Patent: Jan. 15, 2019

(54) ENGINE SUPERCHARGER

(71) Applicant: MAZDA MOTOR CORPORATION, Hiroshima (JP)

(72) Inventors: Yoshiyuki Uehane, Hiroshima (JP); Junji Umemura, Hiroshima (JP); Hideya Horii, Hiroshima (JP); Tomoaki Fujiyama, Iwakuni (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 63 days.

(21) Appl. No.: 15/422,600

(22) Filed: Feb. 2, 2017

(65) Prior Publication Data
US 2017/0241329 A1   Aug. 24, 2017

(30) Foreign Application Priority Data
Feb. 19, 2016   (JP) .................. 2016-029743

(51) Int. Cl.
*F02B 37/02*   (2006.01)
*F01D 9/02*   (2006.01)
*F02B 37/18*   (2006.01)

(52) U.S. Cl.
CPC ............ *F02B 37/183* (2013.01); *F01D 9/026* (2013.01); *F02B 37/025* (2013.01); *F05D 2220/40* (2013.01); *Y02T 10/144* (2013.01)

(58) Field of Classification Search
CPC ...... F01D 9/026; Y02T 10/144; F02B 37/025; F02B 37/183
See application file for complete search history.

(56) References Cited

U.S. PATENT DOCUMENTS

| 4,169,354 A | 10/1979 | Woollenweber |
| 6,073,447 A * | 6/2000 | Kawakami ............. F01D 9/026 |
| | | 60/602 |
| 2014/0109569 A1 | 4/2014 | Tsujita et al. |

FOREIGN PATENT DOCUMENTS

| DE | 102007017775 A1 | 10/2008 |
| JP | S64-056922 A | 3/1989 |
| JP | H04-140425 A | 5/1992 |
| JP | H11-311124 A | 11/1999 |
| JP | 2008-031942 A | 2/2008 |
| JP | 2009-144642 A | 7/2009 |
| JP | 2014-084756 A | 5/2014 |

* cited by examiner

*Primary Examiner* — Audrey K Bradley
(74) *Attorney, Agent, or Firm* — Studebaker & Brackett PC (57) ABSTRACT

Disclosed herein is a technique for providing an engine supercharger allowing an exhaust gas to efficiently act on a turbine in a wide operating range. A turbine for use in a supercharger includes a turbine housing, a turbine scroll formed inside the housing continuously with a turbine lead-in route, and a turbine wheel to turn on an axis of rotation close to a tongue portion. The turbine lead-in route is partitioned by a partition wall into first and second lead-in routes. Exhaust variable valves are provided upstream of the second lead-in route in order to change the flow rate of the exhaust gas to be introduced. When viewed in the direction in which the axis of rotation extends, a downstream end of the partition is aligned with the axis of rotation and the tongue portion.

6 Claims, 7 Drawing Sheets

ENGINE SUPERCHARGER

CROSS-REFERENCE TO RELATED APPLICATION

This application claims priority to Japanese Patent Application No. 2016-029743 filed on Feb. 19, 2016, the entire disclosure of which is hereby incorporated by reference.

BACKGROUND

The present disclosure relates to an engine supercharger to be mounted on vehicles such as motor vehicles.

To increase its output, a vehicle engine is sometimes provided with a turbocharger for supercharging the engine with pressurized air by utilizing the energy of its exhaust gas.

A turbocharger generally includes a turbine and a compressor as its major components. The turbocharger turns the turbine with an exhaust gas released from the engine to generate power that drives the compressor, thereby increasing the manifold air pressure.

The engine speed of a motor vehicle varies significantly according to its traveling condition. Thus, a turbocharger mounted on a motor vehicle is required to exhibit stabilized supercharging performance irrespective of the amount of exhaust gas released, which varies widely from a low-speed operating region where the amount of the exhaust gas released is relatively small through a high-speed operating region where the amount of the exhaust gas released is relatively large.

Japanese Unexamined Patent Publication No. 2008-31942 discloses a technique for improving the performance of such a turbocharger by classifying a group of exhaust passages, through which an exhaust gas is introduced from a plurality of cylinders of an engine into a turbine, into first and second exhaust systems 161 and 162.

Specifically, according to the technique disclosed in Japanese Unexamined Patent Publication No. 2008-31942, the two exhaust systems 161 and 162 have substantially equal flow cross sections, but the first exhaust system 161 is designed to have a shorter passage length and a smaller capacity than the second exhaust system 162. Also, the first exhaust system 161 is introduced into an outer peripheral portion of the turbine 21 and the second exhaust system 162 is introduced into an inner peripheral portion of the turbine 21.

This allows an exhaust gas with a relatively high flow velocity to be introduced into the turbine through the outer peripheral portion, thereby enabling the turbocharger to achieve high supercharging performance in the low-speed operating region.

However, the turbocharger disclosed in Japanese Unexamined Patent Publication No. 2008-31942 still has room for improvement regarding how to use the exhaust gas in an operating region where the amount of the exhaust gas released is relatively small. The reason is that the turbocharger allows the exhaust gas to flow continuously through both of the two exhaust systems.

Meanwhile, Japanese Unexamined Patent Publication No. 2009-144642 discloses an engine system including a variable exhaust valve 30, which varies the cross-sectional area of the opening (i.e., flow cross section) of its exhaust passage according to the engine's operating region, such that the opening area of the exhaust passage is narrowed while the engine is operating in a region where the amount of exhaust gas released is small.

Specifically, according to Japanese Unexamined Patent Publication No. 2009-144642, a duct 51b for introducing the exhaust gas into a turbine is split into an inner portion and an outer portion by a rectifier 56. The turbocharger disclosed in Japanese Unexamined Patent Publication No. 2009-144642 is configured such that when the opening area is decreased by the variable exhaust valve 30, the outer passage is closed and the mainstream exhaust gas is guided by the rectifier 56 into the inner portion of the turbine.

The rectifier 56 enters a turbine chamber 51c while bending inward. More specifically, a terminal portion 56a of the rectifier 56 is extended to the point of facing a tongue portion 51d of a turbine casing 51a (i.e., a portion where the turbine chamber's scroll starts to swirl and which is located close to a turbine wheel) with the turbine wheel interposed between them. That is to say, the terminal portion 56a is arranged close to the turbine wheel.

This allows the turbine wheel to receive great couple of force Fc from the exhaust gas at the terminal portion 56a of the rectifier 56 and the tongue portion 51d, thus applying a great moment to the turbine wheel while decreasing the bending moment acting on a shaft 53 of the turbine wheel.

However, if the rectifier is allowed to extend deep into the turbine chamber as disclosed in Japanese Unexamined Patent Publication No. 2009-144642, then the exhaust gas flowing into the turbine chamber through the inner passage is rather separated from the exhaust gas flowing into the turbine chamber through the outer passage. That is why if the exhaust gas is introduced into the turbine through not only the inner passage but also the outer passage, then the exhaust gas flows coming from the respective cylinders will apply their pressure to the turbine wheel at noticeably different timings, thus generating significant energy loss.

In view of the foregoing background, it is therefore an object of the present disclosure to provide an engine supercharger allowing an exhaust gas to act on a turbine highly efficiently over a wide operating range.

SUMMARY

The present disclosure relates to a supercharger for use in an engine with a turbine.

The turbine includes: a turbine housing assembled with the engine and including a turbine lead-in route, through which an exhaust gas released from respective cylinders of the engine is introduced into the turbine; a turbine scroll arranged inside the turbine housing so as to be located downstream of, and continuously with, the turbine lead-in route and to allow the exhaust gas to pass therethrough while swirling; and a turbine wheel housed in the turbine scroll with its outer peripheral edge located close to a tongue portion of the turbine housing so as to be turned around an axis of rotation by the exhaust gas.

The turbine lead-in route is partitioned by a partition wall into a first lead-in route functioning as an inner route for introducing the exhaust gas into the turbine scroll and a second lead-in route functioning as an outer route for introducing the exhaust gas into the turbine scroll. An exhaust variable valve is provided upstream of the second lead-in route in order to vary a flow rate of the exhaust gas being introduced into the second lead-in route by changing its flow cross section. When viewed in a direction in which the axis of rotation extends, a downstream end of the partition wall, the axis of rotation, and the tongue portion are all aligned with each other.

That is to say, the turbine housing of this supercharger includes a turbine lead-in route which is partitioned by a partition wall into a first lead-in route through which the exhaust gas released from the respective cylinders is introduced into the turbine scroll via an inner route and a second lead-in route functioning as an outer route for introducing the exhaust gas into the turbine scroll. In addition, the exhaust variable valve arranged upstream of the second lead-in route makes the flow rate of the exhaust gas introduced into the second lead-in route variable.

Thus, as in the engine system disclosed in Japanese Unexamined Patent Publication No. 2009-144642, in the operating region where the amount of the exhaust gas released is relatively small, the exhaust variable valve may decrease the amount of the exhaust gas introduced into the second lead-in route and increase the amount of the exhaust gas introduced into the first lead-in route accordingly. This enables efficient use of a limited amount of exhaust gas and allows the exhaust gas to efficiently act on the turbine in a wide operating range.

Furthermore, when viewed in a direction in which the axis of rotation extends, a downstream end of the partition wall, the axis of rotation, and the tongue portion are all aligned with each other. This allows the supercharger to cut down the energy loss of the exhaust gas that will be caused when the exhaust gas is introduced through both of the first and second lead-in routes.

As will be described in detail later, if the downstream end of the partition wall is located upstream of that point, the exhaust gas flow will be disturbed to cause some loss of the energy to be applied to the turbine wheel. Also, if the downstream end of the partition wall is located downstream of that point, then a portion of the exhaust gas continuously released from the respective cylinders which has passed through the first lead-in route and the rest of the exhaust gas continuously released from the respective cylinders which has passed through the second lead-in route will act on the turbine wheel at noticeably different timings, thus resulting in significant loss of the energy to be applied to the turbine wheel. On the other hand, aligning the downstream end of the partition wall with the axis of rotation and the tongue portion allows the supercharger to minimize the loss of the energy of the exhaust gas acting on the turbine wheel.

In an exemplary embodiment of the present disclosure, the exhaust variable valve suitably has its opened/closed state controlled so as to be fully closed when a speed of the engine becomes lower than a preset engine speed and fully opened when the engine speed becomes equal to or higher than the preset engine speed.

In such an embodiment, the exhaust variable valve has its opened/closed state switched at the preset engine speed. Thus, the exhaust gas flow changes significantly at the time of the switch. Particularly when a transition is made from the low speed operating region to the high speed operating region, the exhaust variable valve is fully opened to cause a steep instantaneous increase in the flow cross section of the exhaust gas, even though the amount of the exhaust gas released is relatively small. Thus, the energy of the exhaust gas acting on the turbine wheel would decrease so steeply as to have a negative impact on the drive of the turbine.

In contrast, the turbocharger of the present disclosure is configured to allow the exhaust gas that has passed through both of the first and second lead-in routes to be combined with each other without being disturbed and then efficiently act on the turbine wheel. Thus, even such a rapid steep increase in the flow cross section of the exhaust gas would cause much less loss of the energy of the exhaust gas acting on the turbine wheel such that the drive of the turbine would not be negatively affected excessively.

In another exemplary embodiment of the present disclosure, an outer wall portion of the second lead-in route, facing the partition wall, is suitably curved so as to gradually approach the axis of rotation, and suitably has its downstream end oriented and biased toward the turbine wheel.

According to such an embodiment, the exhaust gas is introduced into the turbine scroll through the second lead-in route while having its flow guided along the outer wall portion and toward the turbine wheel. This allows its flow velocity and dynamic pressure to have an intended effect on the turbine with efficiency.

In still another embodiment of the present disclosure, the turbine scroll is suitably located above the respective cylinders of the engine in a vertical direction defined with respect to the engine, and an inner wall portion of the first lead-in route, facing the partition wall, suitably extends parallel to the partition wall and obliquely upward and toward a downstream point.

According to such an embodiment, the exhaust gas released from the center of the respective cylinders may be introduced smoothly into the turbine scroll via the first lead-in route. This allows the flow velocity and dynamic pressure of the exhaust gas introduced into the turbine scroll through the first lead-in route to have an intended effect on the turbine with efficiency, thus improving the driving force of the turbine.

In yet another exemplary embodiment, the exhaust variable valve may be configured as a butterfly valve with a blocking face that blocks the passage. In that case, one end of the blocking face, located closer to the first lead-in route, is suitably tilted toward a downstream point in a flowing direction of the exhaust gas compared to the other end of the blocking face, located more distant from the first lead-in route, such that the exhaust gas is guided into the first lead-in route when the exhaust variable valve is fully closed.

According to such an embodiment, the exhaust gas may be introduced smoothly into the first lead-in route in an operating region where the amount of the exhaust gas released is relatively small, thus enabling the supercharger to further cut down the loss of the energy of the exhaust gas acting on the turbine wheel.

In yet another exemplary embodiment of the present disclosure, the flow cross section of the first lead-in route is suitably set to be smaller than an overall flow cross section of exhaust ports communicating with the respective cylinders of the engine.

According to such an embodiment, in the operating region where the amount of the exhaust gas is relatively small, the first lead-in route functions as a so-called "exhaust gas diaphragm," thus promoting the release of the exhaust gas and increasing the flow velocity of the exhaust gas. This enables the exhaust gas to act on the turbine wheel even more efficiently.

An engine supercharger according to the present disclosure allows the energy of an exhaust gas to efficiently act on the turbine in a sufficiently wide operating range, thus improving the performance of the supercharger significantly.

DETAILED DESCRIPTION

Embodiments of the present disclosure will now be described in detail with reference to the accompanying drawings. Note, however, that the following description is a mere example in nature and is not intended to limit the scope, application or uses of the present disclosure.

Also, in the following description, the direction will be defined with respect to the engine as in FIGS. 1 and 2. Specifically, the direction in which cylinders C are arranged in the engine body 1 will be hereinafter referred to as a "right and left direction," and the direction perpendicular to the former direction (i.e., the up and down direction in FIG. 1) a "forward and backward direction." One end of the engine on which the turbocharger 5 is provided will be hereinafter referred to as the "front end." The direction in which the centerline of each cylinder C extends (see FIG. 2) will be hereinafter referred to as an "up and down direction." Furthermore, it will be determined with respect to the flowing direction of an exhaust gas whether something is located "upstream" or "downstream" of something else.

(Engine)

Figure 1:
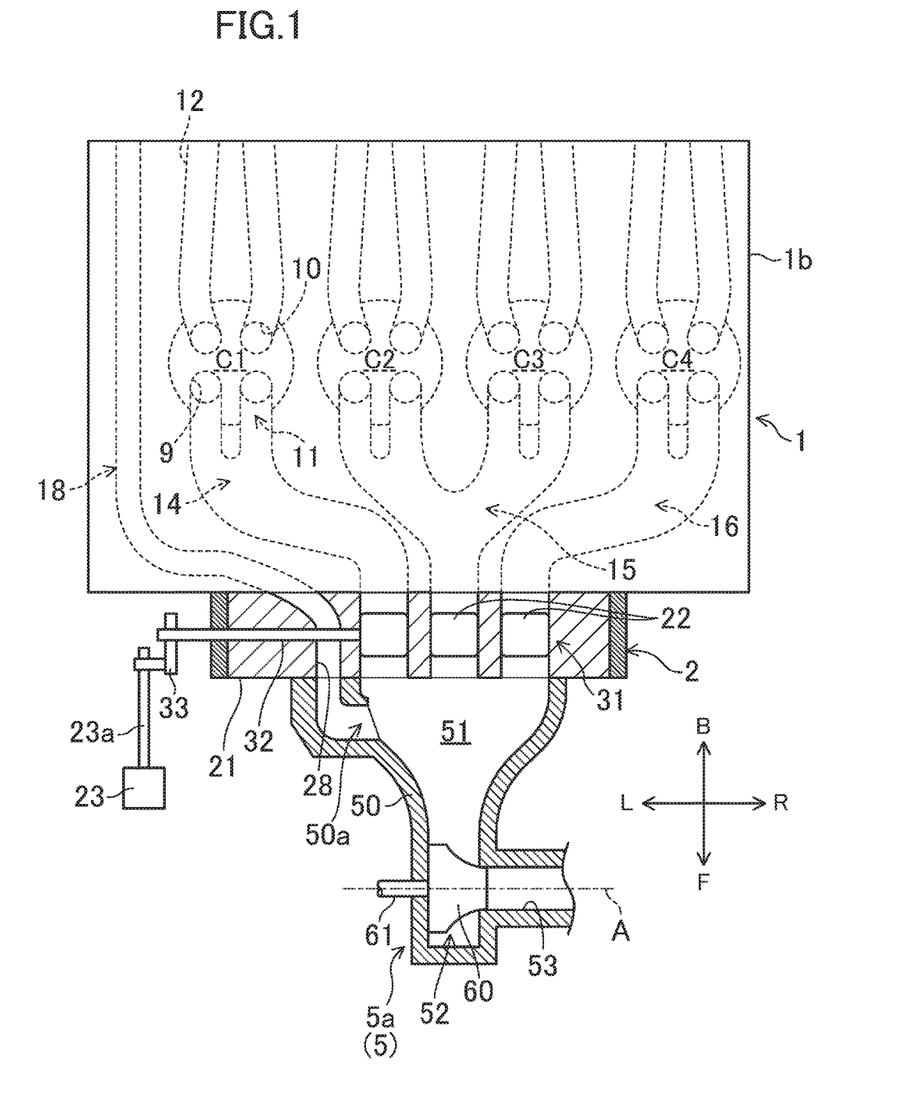
FIG. 1 schematically illustrates an engine equipped with a turbocharger according to an exemplary embodiment.
Figure 2:
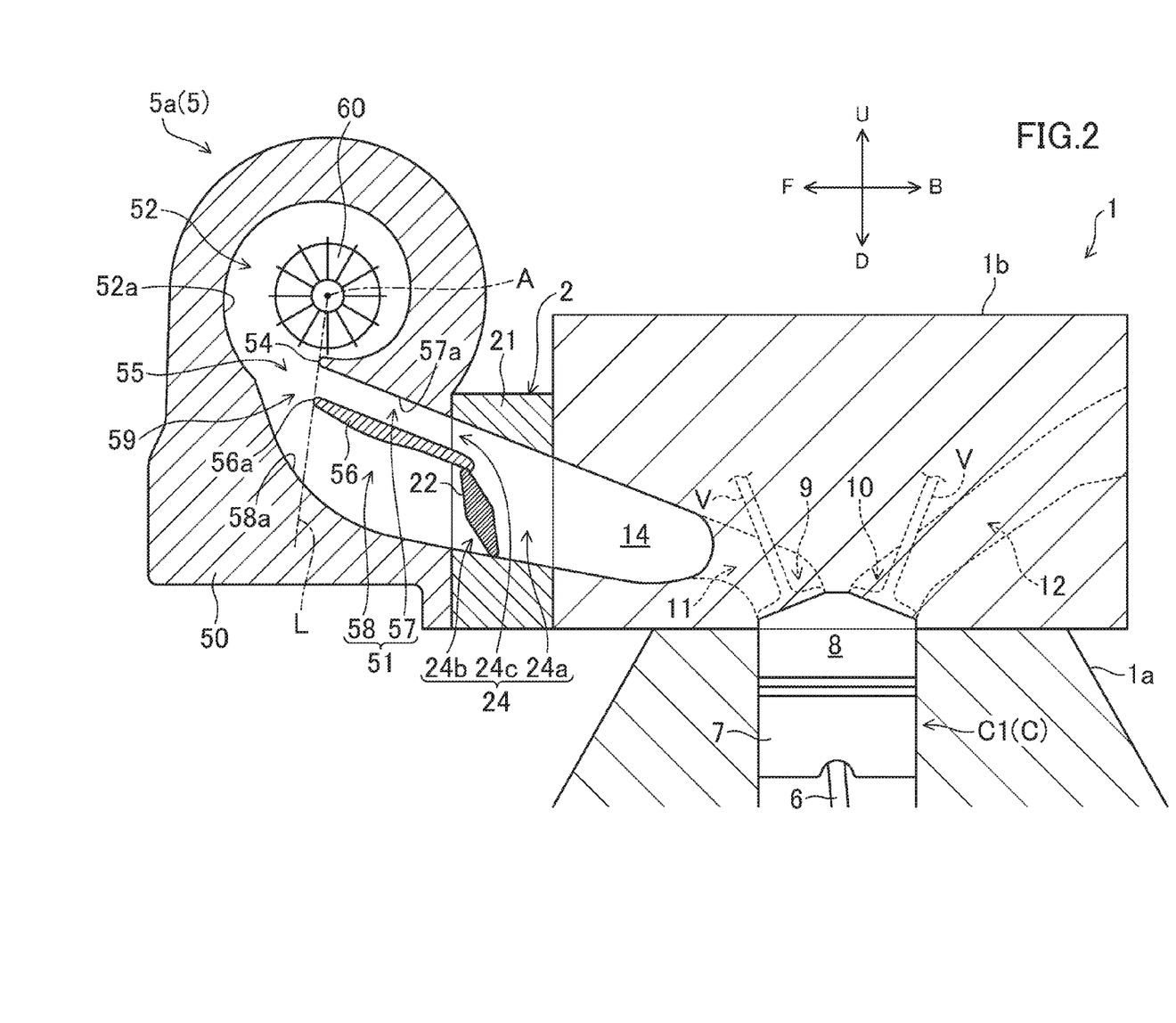
FIG. 2 schematically illustrates a vertical cross section of an engine equipped with a turbocharger according to an exemplary embodiment.

FIGS. 1 and 2 illustrate an exemplary engine equipped with a turbocharger 5 (hereinafter simply referred to as a "supercharger") to which the present disclosure is applied. This is an in-line four-cylinder, four-cycle engine to be mounted on a motor vehicle, and includes an engine body 1 comprised of a cylinder block 1a and a cylinder head 1b mounted on the cylinder block 1a. The cylinder head 1b is integrally assembled with an exhaust valve system 2 and the turbocharger 5.

Four columnar cylinders C, consisting of first, second, third, and fourth cylinders C1, C2, C3, and C4, are arranged to vertically extend from an upper portion of the cylinder block 1a and protrude into the cylinder head 1b. In this embodiment, the fuel is combusted in the order of the first, third, fourth, and second cylinders C1, C3, C4, and C2. Inside each of these cylinders C, housed slidably is a piston 7 coupled to a crankshaft (not shown) via a connecting rod 6. A combustion chamber 8 is defined by the top surface of the piston 7 and an upper portion of each cylinder C.

The top of the combustion chamber 8 has two exhaust vents 9, 9 and two suction vents 10, 10, each of which has its opened/closed states controlled by a valve V. Each exhaust vent 9 communicates with an exhaust port 11 cut through the cylinder head 1b to extend obliquely upward toward the front end. Each suction vent 10 communicates with a suction port 12 cut through the cylinder head 1b to extend obliquely upward toward the rear end. Although not shown, in the cylinder head 1b, an injector for injecting the fuel into the combustion chamber 8, a spark plug for igniting a spark in the combustion chamber 8, a valve control mechanism, and other members are also provided for each of these cylinders C.

The cylinder head 1b includes three independent exhaust passages 14, 15, and 16 provided for the four cylinders C1-C4. Specifically, a first independent exhaust passage 14 combines together the two exhaust ports 11, 11 for use to pass the exhaust gas released from the first cylinder C1. A second independent exhaust passage 15 combines together the four exhaust ports 11, 11, 11, 11 for use to pass the exhaust gas released from the second and third cylinders C2 and C3, which do not pass the exhaust gas in a continuous order. A third independent exhaust passage 16 combines together the two exhaust ports 11, 11 for use to pass the exhaust gas released from the fourth cylinder C4.

The second independent exhaust passage 15 has a Y-branched shape in its upstream portion so as to be used in common for the second and third cylinders C2 and C3. These independent exhaust passages 14, 15 and 16 are formed such that their downstream ends are aggregated together at approximately the center of the cylinder head 1b in the right and left direction and that their openings are arranged in line and adjacent to each other in the right and left direction at the front end of the cylinder head 1b.

The cylinder head 1b further includes an EGR downstream passage 18, which is formed to run forward through the cylinder head 1b on the left-hand side of the first cylinder C1 as shown in FIG. 1. The upstream end of this EGR downstream passage 18 has its opening located on the left of the independent exhaust passage 14 at the front end of the cylinder head 1b. On the other hand, the downstream end of the EGR downstream passage 18 has its opening located on the left of one of the suction ports 12 of the first cylinder C1 at the rear end of the cylinder head 1b.

This engine includes no independent part functioning as an exhaust manifold by itself, which constitutes a single exhaust passage integrating together a plurality of exhaust passages communicating with the cylinders C1-C4. Instead, the first, second and third independent exhaust passages 14, 15, 16 of the cylinder head 1b, first, second and third upstream exhaust passages 24, 25, 26 of the exhaust valve system 2, and a turbine lead-in route 51 of the turbocharger 5 cooperate with each other to form an exhaust manifold.

This engine is configured to increase the manifold air pressure of the intake air introduced into the respective cylinders C1-C4 by activating the turbocharger 5 with the exhaust gas released through the exhaust manifold. In addition, this engine is also configured to allow the turbocharger 5 to increase the engine torque effectively in a wide engine speed range from a low-speed region through a high-speed region by having the exhaust valve system 2, provided between the engine body 1 and the turbocharger 5, control the flow velocity and dynamic pressure of the exhaust gas introduced into the turbocharger 5 according to the traveling condition of the motor vehicle.

(Exhaust Valve System 2)

Figure 3:
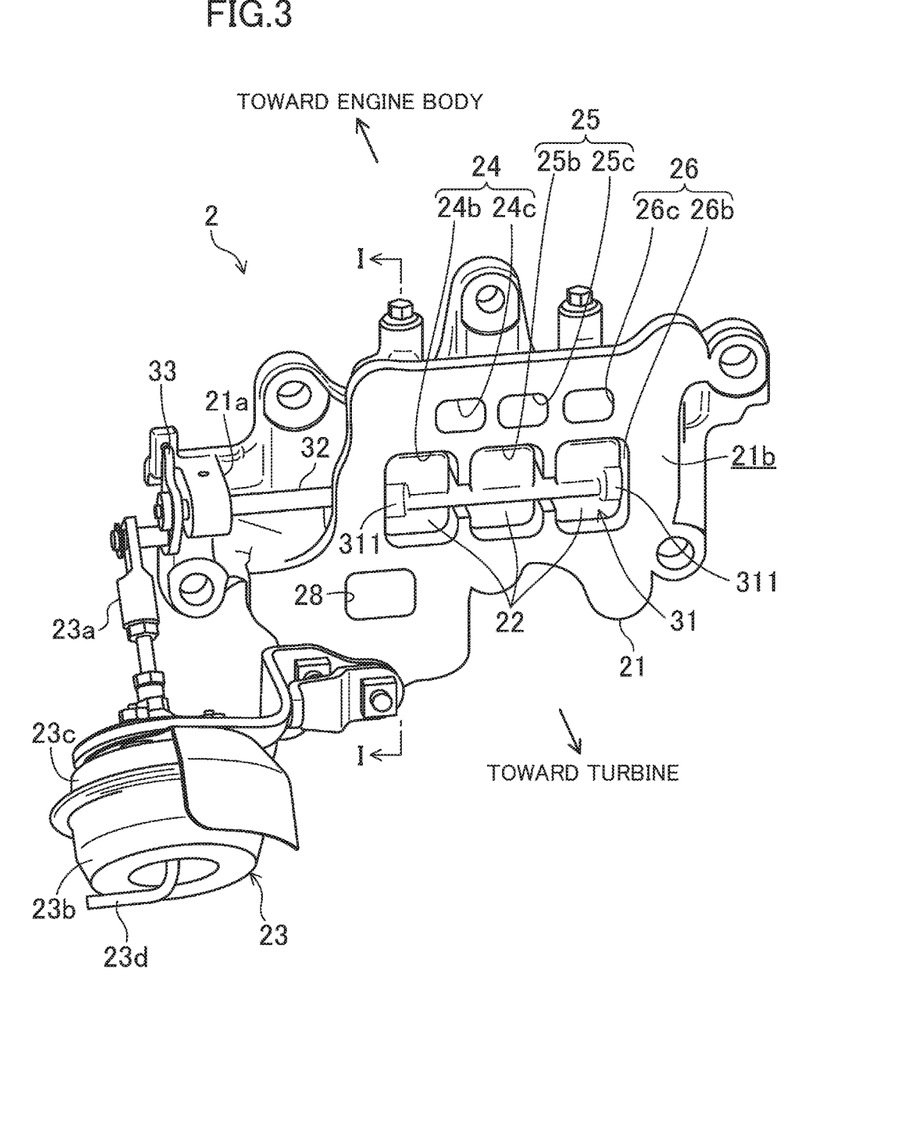
FIG. 3 is a perspective view of an exhaust valve system as viewed from a turbine.

FIG. 3 illustrates an exhaust valve system 2 as viewed from the turbine 5a. This exhaust valve system 2 is designed to change the flow velocity and dynamic pressure of the exhaust gas introduced into the turbocharger 5 by changing the flow cross section of the exhaust gas released from the engine body 1. The exhaust valve system 2 is secured to the front surface of the cylinder head 1b with bolts.

This exhaust valve system 2 includes a system body 21 configured as a metallic cast body, exhaust variable valves 22, and a negative pressure actuator 23. The system body 21 includes three independent upstream exhaust passages (hereinafter referred to as first, second and third upstream exhaust passages) 24, 25, 26 respectively communicating with the independent exhaust passages 14, 15, 16 of the cylinder head 1*b*, and an EGR intermediate passage 28 communicating with the EGR downstream passage 18 of the cylinder head 1*b*.

Figure 4:
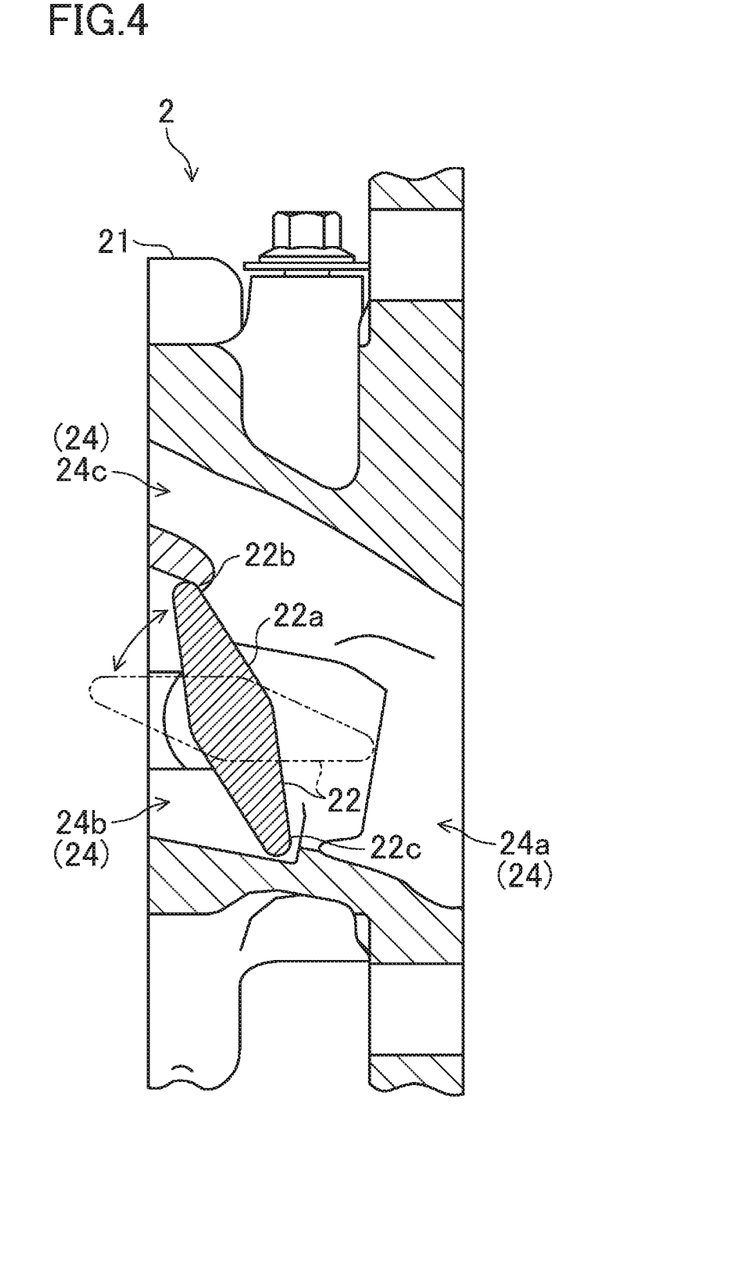
FIG. 4 is a cross-sectional view taken along the plane I-I shown in FIG. 3.

Each of these upstream exhaust passages 24, 25, 26 has a Y-branched shape in its downstream portion. Specifically, as shown in FIGS. 2, 3, and 4, the first upstream exhaust passage 24 includes a common passage 24*a* communicating with the first independent exhaust passage 14 of the cylinder head 1*b*, and high- and low-speed passages 24*b* and 24*c* functioning as lower and upper passages branching from this common passage 24*a*.

Although not shown, each of the second and third upstream exhaust passages 25 and 26 also includes a common passage 25*a*, 26*a* communicating with the independent exhaust passage 15, 16 of the cylinder head 1*b*, and high- and low-speed passages 25*b*, 25*c* and 26*b*, 26*c* functioning as lower and upper passages branching from this common passage 25*a*, 26*a*.

In each of the first, second and third upstream exhaust passages 24, 25, 26, the low-speed passage 24*c*, 25*c*, 26*c* is formed to have a smaller flow cross section than the high-speed passage 24*b*, 25*b*, 26*b*.

The high-speed passages 24*b*, 25*b*, 26*b* each have a generally rectangular cross section and are arranged in line in the right and left direction as shown in FIG. 3. Likewise, the low-speed passages 24*c*, 25*c*, 26*c* each also have a generally rectangular cross section and are arranged in line in the right and left direction above the high-speed passages 24*b*, 25*b*, 26*b*, respectively, as shown in FIG. 3.

On the other hand, as shown in FIGS. 1 and 3, the EGR intermediate passage 28 is provided at a left end of the system body 21. This EGR intermediate passage 28 has a generally rectangular cross section and is located on a lower left side of the high-speed passage 24*b* of the first upstream exhaust passage 24.

The exhaust variable valves 22 open and close the respective flow channels of the high-speed passages 24*b*, 25*b*, 26*b* of the upstream exhaust passages 24, 25, 26. The exhaust variable valves 22 are comprised of three butterfly valves provided for the respective high-speed passages 24*b*, 25*b*, 26*b*. These three exhaust variable valves 22, 22, 22 arranged side by side in the right and left direction are coupled together to form a valve body 31.

The valve body 31 is provided for the system body 21 so as to cross the respective centers of the transverse cross sections of the high-speed passages 24*b*, 25*b*, 26*b*. The valve body 31 is rotatably supported by the system body 21 via supporting portions 311 at right and left ends thereof.

As shown in FIGS. 3 and 4, the respective exhaust variable valves 22 have a rectangular plate shape corresponding to the cross section of their associated high-speed passages 24*b*, 25*b*, 26*b*. Each of the exhaust variable valves 22 has a blocking face 22*a* that blocks an associated one of these passages 24*b*, 25*b* or 26*b* when facing a downstream point.

Each exhaust variable valve 22 switches into either a state indicated by the solid profile in FIG. 4 where the high-speed passage 24*b*, 25*b*, or 25*b* is fully closed or a state indicated by the two-dot chain in FIG. 4 where the high-speed passage 24*b*, 25*b*, or 25*b* is fully opened.

Each exhaust variable valve 22 is designed such that its blocking face 22*a* tilts in the fully closed state. More specifically, the exhaust variable valve 22 is designed such that an upper portion (hereinafter referred to as an "end portion 22*b* facing toward the first passage") of each blocking face 22*a* that blocks its associated high-speed passage 24*b*, 25*b*, 26*b* tilts toward a downstream end with respect to a lower portion (hereinafter referred to as an "end portion 22*c* facing away from the first passage") thereof and that the exhaust gas collided against the blocking face 22*a* is smoothly guided toward the low-speed passage 24*c*, 25*c*, 26*c*. Each of these exhaust variable valves 22 is designed to have a normally open state.

A drive shaft 32 is coupled to a left end portion of the valve body 31 and is extended out of the left end of the upstream exhaust passages 24, 25 and 26. The extended portion of the drive shaft 32 is rotatably supported by an auxiliary bearing 21*a*, which forms an integral part of the system body 21, and a lever member 33 for regulating the rotation of the drive shaft 32 is attached to the tip end of the shaft 32. The lever member 33 is coupled to an output shaft 23*a* of the negative pressure actuator 23 via a pin.

As shown in FIG. 3, the negative pressure actuator 23 is located closer to the turbine 5*a*, and secured to the system body 21 via a bracket. The negative pressure actuator 23 includes a first casing 23*b* and a second casing 23*c*, which have been butt-joined together. The inner space of the negative pressure actuator 23 is partitioned by a diaphragm (not shown), to which the output shaft 23*a* is connected, into a negative pressure chamber located closer to the first casing 23*b* and a positive pressure chamber located closer to the second casing 23*c*.

A negative pressure tube 23*d* is connected to the bottom of the first casing 23*b*. A negative pressure at the engine manifold is applied to, or removed from, the negative pressure chamber through the negative pressure tube 23*d*, thus displacing the diaphragm. The displacement of the diaphragm in turn moves the output shaft 23*a* back and forth to turn the drive shaft 32.

That is to say, the negative pressure actuator 23 drives the respective exhaust variable valves 22 in rotation via the drive shaft 32, thereby opening and closing the respective high-speed passages 24*b*, 25*b*, 26*b* at the same time.

Figure 5:
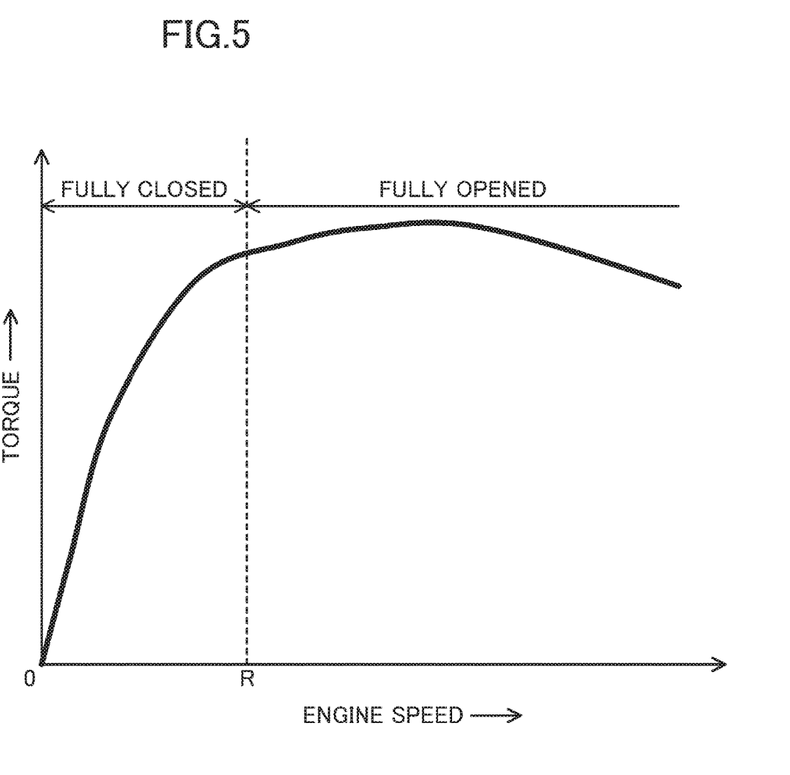
FIG. 5 is a graph showing the performance of an engine equipped with a turbocharger according to an exemplary embodiment.

As shown in FIG. 5, the respective exhaust variable valves 22 of this engine have their opened and closed states controlled so as to be fully closed when the engine speed is less than a preset number of revolutions R and fully opened when the engine speed is equal to or greater than the preset number of revolutions R. That is to say, a number of revolutions R (of 1600 rpm, for example) obtained empirically, for example, has been preset as control data for this engine, and the respective exhaust variable valves 22 are opened or closed at that preset number of revolutions R.

Thus, in the low-speed operating region where the engine speed is less than the preset number of revolutions R and the amount of the exhaust gas released is small, the exhaust gas can no longer enter any of the high-speed passages 24*b*, 25*b* and 26*b*, and all of the exhaust gas flowing through the common passages 24*a*, 25*a* and 26*a* enters the low-speed passages 24*c*, 25*c*, and 26*c*.

On the other hand, in the high-speed operating region where the engine speed is equal to or greater than the preset number of revolutions R and the amount of the exhaust gas released is large, the exhaust gas flowing through the common passages 24*a*, 25*a* and 26*a* enters all of the low-speed passages 24*c*, 25*c*, and 26*c* and high-speed passages 24*b*, 25*b*, and 26*b*.

(Turbocharger 5)

The turbocharger 5 includes, as its major components, a turbine 5*a* and a compressor (not shown; arranged in an intake passage, for example). As shown in FIGS. 1 and 2, the turbine 5*a* is assembled with the cylinder head 1*b* with the exhaust valve system 2 interposed between them, and is comprised of a turbine housing 50, a turbine wheel 60, and other members.

The turbine housing 50 is secured to a clamp face 21*b* of the system body 21 (see FIG. 3), and houses a turbine lead-in route 51 and a turbine scroll 52 inside.

As shown in FIG. 1, an EGR upstream passage 50*a*, communicating with the EGR intermediate passage 28 of the exhaust valve system 2, is provided on the left-hand side of the turbine lead-in route 51 of the turbine housing 50. Part of the exhaust gas entering the turbine 5*a* is introduced, as an EGR gas, into the intake passage through the EGR upstream passage 50*a*, EGR intermediate passage 28, and EGR downstream passage 18. That is to say, in this engine, an EGR passage is formed by the EGR downstream passage 18, EGR intermediate passage 28, and EGR upstream passage 50*a*.

As shown in FIG. 2, the turbine scroll 52 is a vortex member communicating with a downstream portion of the turbine lead-in route 51, and is formed such that its peripheral wall portion 52*a* surrounds its axis of rotation A extending in the right and left direction. The turbine scroll 52 is located above the respective cylinders C1-C4 of the engine and the turbine lead-in route 51 in the up and down direction. The turbine wheel 60 is housed in the turbine scroll 52 with its front side having a plurality of radial fins facing the passage.

A coupling shaft 61, extending through a left side portion of the turbine housing 50, is secured to the reverse side of the turbine wheel 60. The turbine wheel 60 is coupled to a compressor (not shown) via this coupling shaft 61, and is freely rotatable on the axis of rotation A. A right side portion of the turbine housing 50, facing the front side of the turbine wheel 60, includes a turbine lead-out route 53 extending along the axis of rotation A.

The exhaust gas, introduced into the turbine scroll 52 through the turbine lead-in route 51 and swirled by the turbine scroll 52, is released through this turbine lead-out route 53 into an exhaust passage (not shown).

A tongue portion 54 of the peripheral wall portion 52*a* of the turbine scroll 52, i.e., one end of the peripheral wall portion 52*a* where the turbine scroll 52 starts to whirl, is located under the axis of rotation A. The peripheral wall portion 52*a* extends from the tongue portion 54 while drawing a circular pattern toward the engine (i.e., backward) until just before completing one round about the axis of rotation A while gradually increasing its distance from the axis of rotation A. An opening 55 for introducing the exhaust gas into the turbine scroll 52 is provided between the other end (i.e., a terminal portion) of the peripheral wall portion 52*a* where the turbine scroll 52 finishes whirling and the tongue portion 54.

The turbine wheel 60 is designed such that its outer peripheral edge is located close to the tongue portion 54. Thus, the flow of the exhaust gas swirling around inside the turbine scroll 52 is cut off at the site of the tongue portion 54, and guided toward the turbine lead-out route 53. As a result, the exhaust gas does not stagnate in, but smoothly passes through, the turbine scroll 52. This allows the turbine wheel 60 to turn efficiently under the flow velocity and dynamic pressure of the exhaust gas being introduced into the turbine scroll 52.

The turbine lead-in route 51 is a passage through which the exhaust gas released from the respective cylinders C1-C4 is introduced into the turbine scroll 52 via the independent exhaust passages 14, 15, 16 and the upstream exhaust passages 24, 25, 26. The downstream end of the turbine lead-in route 51 is connected to the opening 55 of the turbine scroll 52. On the other hand, the upstream end of the turbine lead-in route 51 is connected to the respective openings of the low-speed passages 24*c*, 25*c*, 26*c* and high-speed passages 24*b*, 25*b*, 26*b* through the clamp face 21*b*.

As shown in FIG. 1, the turbine lead-in route 51 is formed in a tapering shape in which the lateral width thereof gradually decreases from an upstream point toward a downstream point. That is to say, the exhaust gas released from the respective cylinders C1-C4 is introduced into the turbine scroll 52 after having passed through such a constricted flow passage.

As shown in FIG. 2, the exhaust gas passage is formed such that each of the respective exhaust ports 11 running obliquely upward and forward is extended straight from the downstream end of the exhaust port 11 through the downstream end of the turbine lead-in route 51.

A partition wall 56 that partitions the route into upper and lower routes is provided inside the turbine lead-in route 51 extending obliquely upward. This partition wall 56 partitions the turbine lead-in route 51 into a first lead-in route 57 functioning as an inner route for introducing the exhaust gas into the turbine scroll 52 and a second lead-in route 58 functioning as an outer route for introducing the exhaust gas into the turbine scroll 52.

The first lead-in route 57 communicates with, and combines together, all of the low-speed passages 24*c*, 25*c*, 26*c*. Likewise, the second lead-in route 58 communicates with, and combines together, all of the high-speed passages 24*b*, 25*b*, 26*b*.

The exhaust gas is introduced continuously into the first lead-in route 57 irrespective of the engine speed. On the other hand, the exhaust variable valves 22 are provided upstream of the second lead-in route 58, and therefore, the exhaust gas is introduced into the second lead-in route 58 only when the engine speed is equal to or greater than the preset number of revolutions R.

The partition wall 56 is a wall member with an approximately uniform thickness, arranged closer to the upper part of the turbine lead-in route 51, and extends obliquely upward in accordance with the gradient of the turbine lead-in route 51. An inner peripheral wall portion 57*a* corresponding to the upper part of the turbine lead-in route 51 and facing the partition wall 56 of the first lead-in route 57 linearly extends obliquely upward toward a downstream point and parallel to the partition wall 56. A downstream end of the inner peripheral wall portion 57*a* is continuous with the tongue portion 54.

Furthermore, an upstream end of the inner peripheral wall portion 57*a* is continuous with the respective upper parts of the independent exhaust passages 14, 15, 16 and upstream exhaust passages 24, 25, 26. This engine 1 is designed such that the overall upper part of the exhaust passage has a linear cross section. This allows the exhaust gas released from the center of the cylinders C1-C4 to be smoothly introduced through the first lead-in route 57 into the turbine scroll 52. Thus, the exhaust gas introduced into the turbine scroll 52 through the first lead-in route 57 may have its flow velocity and dynamic pressure produce an intended effect on the turbine 5*a* efficiently.

On the other hand, an outer peripheral wall portion 58*a*, corresponding to the lower part of the turbine lead-in route 51 and facing the partition wall 56 in the second lead-in route 58, has a downwardly swelling curved shape approaching the axis of rotation A. The downstream end of the outer peripheral wall portion 58*a* is oriented and biased toward the turbine wheel 60. Thus, the exhaust gas introduced into the turbine scroll 52 through the second lead-in route 58 has its flow guided upward along the outer peripheral wall portion 58a and is eventually introduced into the turbine scroll 52 so as to approach the turbine wheel 60. Thus, the exhaust gas introduced into the turbine scroll 52 through the second lead-in route 58 may also have its flow velocity and dynamic pressure produce an intended effect on the turbine 5a efficiently.

The flow cross sections of the first and second lead-in routes 57 and 58 respectively correspond to that of the low-speed passages 24c, 25c, 26c and that of the high-speed passages 24b, 25b, 26b. The first lead-in route 57 has a smaller flow cross section than the second lead-in route 58. In addition, these settings are determined based on the timings to open and close the respective exhaust variable valves 22. Thus, in this embodiment, the opened and closed states of the respective exhaust variable valves 22 are supposed to be changed when the engine speed is 1600 rpm. If the opened and closed states need to be changed when the engine speed reaches 1800 rpm, then the flow passage of the exhaust gas to pass through only the first lead-in route 57 increases by 200 rpm, and therefore, the difference in flow cross section between the first and second lead-in routes 57 and 58 decreases compared to this embodiment. Furthermore, the flow cross section of the first lead-in route 57 is set to be smaller than the combined flow cross section of the two exhaust ports 11, 11 communicating with the respective cylinders C.

Setting the flow cross section of the first lead-in route 57 to be smaller than the combined flow cross section of the two exhaust ports 11, 11 communicating with the respective cylinders C triggers the Venturi effect in the first lead-in route 57 in a low-speed operating region where the exhaust variable valves 22 are fully closed. This promotes releasing the exhaust gas more efficiently and introducing the exhaust gas into the turbine scroll 52 at increased flow velocities, thus allowing the exhaust gas to act on the turbine wheel 60 more efficiently.

Furthermore, a combining portion 59 where the first and second lead-in routes 57 and 58 are combined together is provided at the downstream end of the turbine lead-in route 51. In a high-speed operating region where the exhaust variable valves 22 are fully opened, the exhaust gas flows that have passed through the first and second lead-in routes 57 and 58 are combined together at this combining portion 59, and the combined exhaust gas flow is introduced into the turbine scroll 52.

To introduce the exhaust gas into the turbine scroll 52 with good stability and efficiency, no matter whether the exhaust gas is introduced through only the first lead-in route 57 (i.e., in the low-speed operating region) or through both of the first and second lead-in routes 57 and 58 (i.e., in the high-speed operating region), the location of the downstream end of the partition wall 56 defining the combining portion 59 is determined specifically via experiments.

More specifically, as shown in FIG. 2, which is a cross-sectional view as viewed in the direction in which the axis of rotation A extends, the downstream end 56a of the partition wall 56 is arranged in line with the axis of rotation A and the tongue portion 54. In other words, the downstream end 56a of the partition wall 56 is arranged so as to located on, or at least in the vicinity of, the extension L of a line segment connecting together the axis of rotation A and the tongue portion 54 (e.g., within 5 mm on either side of the extension L with a design tolerance taken into account) in a vertical cross section taken along the forward and backward direction.

Setting the downstream end 56a of the partition wall 56 upstream of this point would subject the exhaust gas flows introduced through both of the first and second lead-in routes 57 and 58 to disturbance at the combining portion 59, thus causing loss of the energy applied to the turbine wheel 60.

Likewise, setting the downstream end 56a of the partition wall 56 downstream of this point would also cause loss of the energy applied to the turbine wheel 60 when the exhaust gas flows are introduced through both of the first and second lead-in routes 57 and 58.

Furthermore, the exhaust gas that has passed through the second lead-in route 58 is guided by the outer peripheral wall portion 58a toward the turbine wheel 60. Setting the downstream end 56a of the partition wall 56 downstream of this point would cause the exhaust gas to collide against, and have its flow obstructed by, the downstream end 56a of the partition wall 56, thus also involving loss of the energy applied to the turbine wheel 60.

In this engine, the exhaust variable valves 22 are opened and closed at the preset number of revolutions R, and therefore, the exhaust gas flow changes significantly at that timing. Particularly when the mode is switched from the low-speed operating region to the high-speed operating region, the exhaust variable valves 22 are fully opened to cause a steep increase in the flow cross section of the exhaust gas, even though the amount of the exhaust gas released is relatively small Thus, the energy of the exhaust gas acting on the turbine wheel 60 could decrease too steeply to avoid negatively affecting the drive of the turbine 5a.

In contrast, in this turbocharger 5, the exhaust gas flows that have passed through both of the first and second lead-in routes 57 and 58 are allowed to be combined together at the combining portion 59 disposed at the best location, and then the combined flow efficiently acts on the turbine wheel 60. Thus, even if the flow cross section of the exhaust gas increases steeply and rapidly, the loss of the energy of the exhaust gas acting on the turbine wheel 60 may be cut down to the point that the drive of the turbine 5a is not negatively affected excessively.

Figure 6:
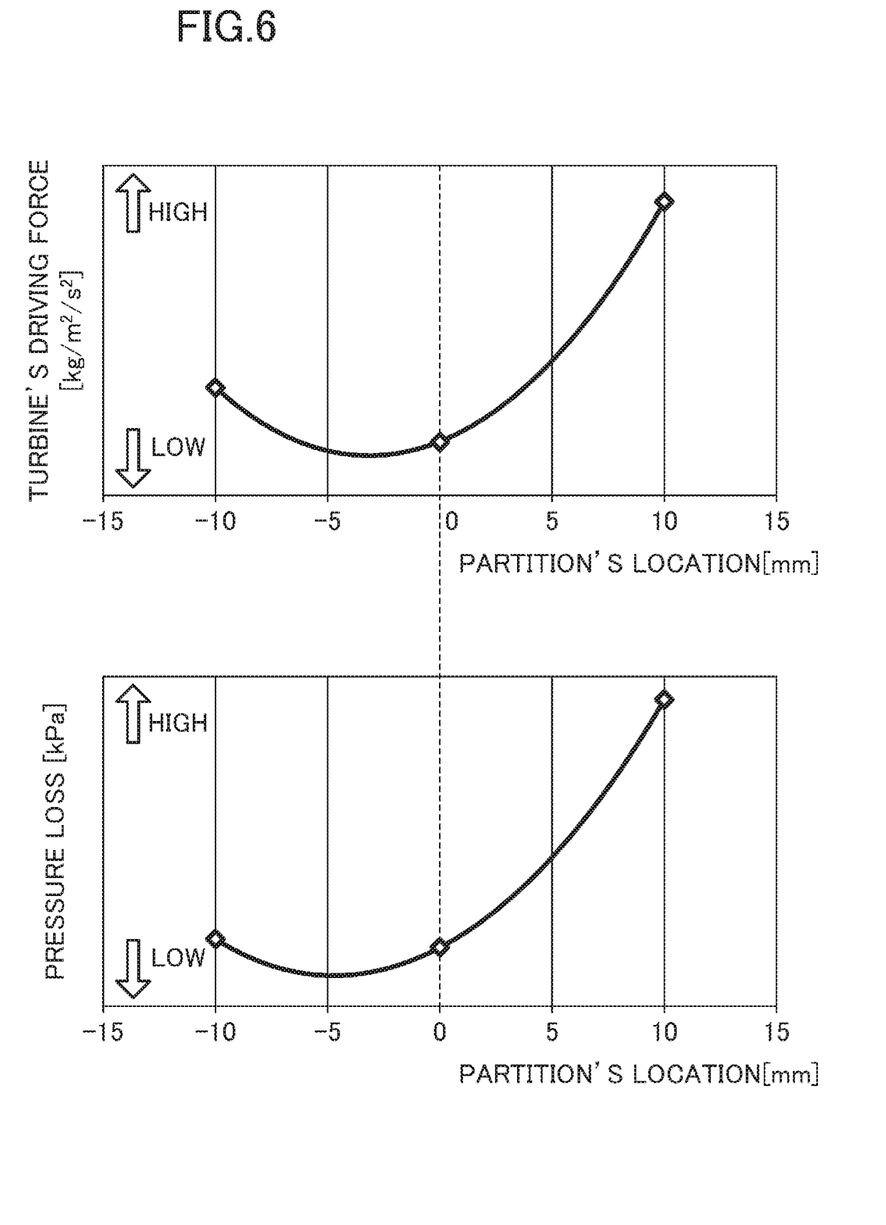
FIG. 6 illustrates graphs showing exemplary results of comparative experiments obtained when the exhaust valve system was opened.

FIG. 6 shows exemplary results of comparative experiments carried out to confirm the effect of changing the location of the downstream end 56a of the partition wall 56 when the exhaust valve system 2 was "opened." Specifically, the graphs shown in FIG. 6 indicate how a change in the location of the downstream end 56a of the partition wall 56 affected a relationship between the driving force of the turbine wheel 60 and the pressure loss caused in the turbine in the high-speed operating region where exhaust gas flows were introduced into the turbine 5a through both of the first and second lead-in routes 57 and 58. In FIG. 6, the pressure loss is represented by the difference in pressure between the exhaust gas in the turbine lead-out route 53 and the exhaust gas in the common passage 24a.

The data points corresponding to the middle of the axis of abscissas indicate the results obtained in an arrangement according to this embodiment in which the axis of rotation A, the tongue portion 54, and the downstream end 56a of the partition wall 56 were all aligned with each other. The curve plotted on the left-hand side of the middle of the axis of abscissas represents the results obtained when the downstream end 56a of the partition wall 56 was shifted by 10 mm upstream of the extension L. The curve plotted on the right-hand side of the middle of the axis of abscissas represents the results obtained when the downstream end 56a of the partition wall 56 was shifted by 10 mm downstream of the extension L.

As is clear from FIG. 6, when the downstream end 56a was shifted by 10 mm downstream of the extension L, not only the turbine's driving force but also the pressure loss in the turbine increased steeply compared to the situation where the downstream end 56a was located on the extension L. On the other hand, when the downstream end 56a was shifted by 10 mm upstream of the extension L, the turbine's driving force and the pressure loss in the turbine both increased compared to the situation where the downstream end 56a was located on the extension L. However, the increase was less significant in the latter situation than in the former situation.

Figure 7:
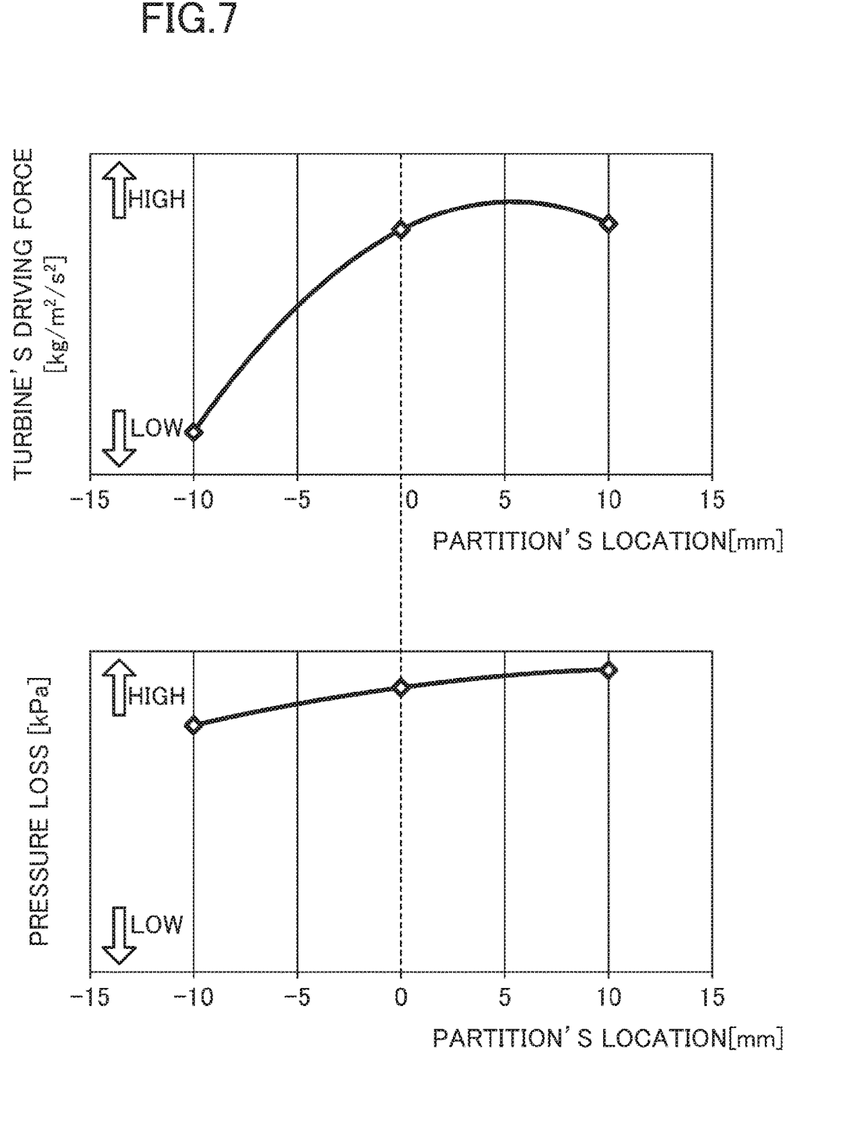
FIG. 7 illustrates graphs showing exemplary results of comparative experiments obtained when the exhaust valve system was closed.

FIG. 7 shows exemplary results of comparative experiments carried out to confirm the effect of changing the location of the downstream end 56a of the partition wall 56 when the exhaust valve system 2 was "closed." Specifically, the graphs shown in FIG. 7 indicate how a change in the location of the downstream end 56a of the partition wall 56 affected a relationship between the driving force of the turbine wheel 60 and the pressure loss caused in the turbine in the low-speed operating region where exhaust gas was introduced into the turbine 5a through only the first lead-in route 57. In FIG. 7, the pressure loss is represented by the difference in the pressure of the exhaust gas between the outlet and inlet of the turbine.

The data points corresponding to the middle of the axis of abscissas indicate the results obtained in an arrangement according to this embodiment in which the axis of rotation A, the tongue portion 54, and the downstream end 56a of the partition wall 56 were all aligned with each other. The curve plotted on the left-hand side of the middle of the axis of abscissas represents the results obtained when the downstream end 56a of the partition wall 56 was shifted by 10 mm upstream of the extension L. The curve plotted on the right-hand side of the middle of the axis of abscissas represents the results obtained when the downstream end 56a of the partition wall 56 was shifted by 10 mm downstream of the extension L.

As is clear from FIG. 7, when the downstream end 56a was shifted by 10 mm downstream of the extension L, the pressure loss did increase, but the turbine's driving force did not change significantly, compared to the situation where the downstream end 56a was located on the extension L. On the other hand, when the downstream end 56a was shifted by 10 mm upstream of the extension L, the turbine's driving force decreased significantly compared to the situation where the downstream end 56a was located on the extension L.

As can be seen from the foregoing description, the turbocharger 5 of this embodiment may effectively counterbalance the driving force of the turbine wheel 60 with the pressure loss caused in the turbine when the exhaust variable valves 22 are opened and closed. This allows the energy of the exhaust gas to efficiently act on the turbine 5a in a wide operating range, thus improving the driving force of the turbine 5a significantly.

As can be seen from the results shown in FIGS. 6 and 7, the advantages of this embodiment may also be achieved even if the downstream end 56a of the partition wall 56 is located within the range from 5 mm upstream of the extension L through 5 mm downstream of the extension L.

Note that the embodiments of a supercharger described above are only non-limiting exemplary embodiments of the present disclosure. That is to say, various modifications may be made to those described embodiments without departing from the spirit and scope of the present disclosure. In other words, a supercharger according to the present disclosure is readily modifiable to have any of various other alternative configurations. For example, in the embodiment described above, the present disclosure is supposed to be applied to an in-line four-cylinder, four-cycle engine. However, the present disclosure is also applicable to any other types of engines as well. Likewise, detailed configurations of the exhaust valve system 2 and turbocharger 5 described above may also be modified according to the specifications required unless those modifications depart from the scope of the present disclosure.

What is claimed is:

1. A supercharger for use in an engine with a turbine, the turbine comprising:
   a turbine housing assembled with the engine and including a turbine lead-in route, through which an exhaust gas released from respective cylinders of the engine is introduced into the turbine;
   a turbine scroll arranged inside the turbine housing so as to be located downstream of, and continuously with, the turbine lead-in route and to allow the exhaust gas to pass therethrough while swirling; and
   a turbine wheel housed in the turbine scroll with an outer peripheral edge of the turbine wheel located close to a tongue portion of the turbine housing so as to be turned around an axis of rotation by the exhaust gas, wherein
   the turbine lead-in route is partitioned by a partition wall into a first lead-in route functioning as an inner route for introducing the exhaust gas into the turbine scroll and a second lead-in route functioning as an outer route for introducing the exhaust gas into the turbine scroll,
   an exhaust variable valve is provided upstream of the second lead-in route in order to vary a flow rate of the exhaust gas being introduced into the second lead-in route by changing a flow cross section of the second lead-in route, and
   when viewed in a direction in which the axis of rotation extends, a downstream end of the partition wall, the axis of rotation, and the tongue portion are all aligned with each other, and an outer wall portion, facing the partition wall in the second lead-in route, has a curved shape to be oriented and biased closer toward the turbine wheel than toward an inner face of the turbine scroll.

2. The supercharger of claim 1, wherein
   the turbine scroll is located above the respective cylinders of the engine in a vertical direction defined with respect to the engine, and
   an inner wall portion of the first lead-in route, facing the partition wall, extends parallel to the partition wall and obliquely upward and toward a downstream point.

3. The supercharger of claim 1, wherein
   the exhaust variable valve is configured as a butterfly valve with a blocking face that blocks the second lead-in route, and
   one end of the blocking face, located closer to the first lead-in route, is tilted toward a downstream point in a flowing direction of the exhaust gas compared to the other end of the blocking face, located more distant from the first lead-in route, such that the exhaust gas is guided into the first lead-in route when the exhaust variable valve is fully closed.

4. The supercharger of claim 1, wherein
   an opened/closed state of the exhaust variable valve is controlled so as to be fully closed when a speed of the engine becomes lower than a preset engine speed and fully opened when the engine speed becomes equal to or higher than the preset engine speed.

5. The supercharger of claim 4, wherein
the turbine scroll is located above the respective cylinders of the engine in a vertical direction defined with respect to the engine, and
an inner wall portion of the first lead-in route, facing the partition wall, extends parallel to the partition wall and obliquely upward and toward a downstream point.

6. The supercharger of claim 4, wherein
a flow cross section of the first lead-in route is set to be smaller than an overall flow cross section of exhaust ports communicating with the respective cylinders of the engine.

* * * * *